(12) United States Patent
Kuwahara et al.

(10) Patent No.: US 9,975,556 B2
(45) Date of Patent: May 22, 2018

(54) CONTROL DEVICE FOR VEHICLE

(71) Applicant: TOYOTA JIDOSHA KABUSHIKI KAISHA, Toyota-shi, Aichi-ken (JP)

(72) Inventors: Seiji Kuwahara, Susono (JP); Seiji Masunaga, Numazu (JP); Takayuki Ando, Shizuoka-ken (JP); Yuki Aratsu, Kanagawa-ken (JP); Hirotsugu Yoshino, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days. days.

(21) Appl. No.: 15/323,184

(22) PCT Filed: Jun. 24, 2015

(86) PCT No.: PCT/IB2015/001164
§ 371 (c)(1),
(2) Date: Dec. 30, 2016

(87) PCT Pub. No.: WO2016/001745
PCT Pub. Date: Jan. 7, 2016

(65) Prior Publication Data
US 2017/0129490 A1 May 11, 2017

(30) Foreign Application Priority Data

Jul. 4, 2014 (JP) ................................ 2014-139054

(51) Int. Cl.
*B60W 10/02* (2006.01)
*B60W 30/188* (2012.01)
(Continued)

(52) U.S. Cl.
CPC .......... *B60W 30/188* (2013.01); *B60W 10/02* (2013.01); *B60W 10/06* (2013.01);
(Continued)

(58) Field of Classification Search
None
See application file for complete search history.

(56) References Cited

U.S. PATENT DOCUMENTS 6,309,324 B1 * 10/2001 Sawa ...................... F16H 61/12
477/125
2002/0066328 A1 6/2002 Ochi et al.
(Continued)

FOREIGN PATENT DOCUMENTS

JP 2002-174335 A 6/2002

*Primary Examiner* — Justin Holmes
(74) *Attorney, Agent, or Firm* — Hunton Andrews Kurth LLP

(57) ABSTRACT

A control device for a vehicle is provided. The vehicle includes a transmission and an engine configured to input a torque into the transmission. The transmission has multiple transmission stages and includes a first engagement mechanism and a second engagement mechanism. The control device includes an ECU configured to: (a) control the second engagement mechanism when a second transmission stage is set such that the capacity of torque transmission of the second engagement mechanism is increased and a thrust for separating a first member and a second member of the first engagement mechanism from each other in an axial direction is generated; (b) calculate a decrement in an output torque of the transmission when the capacity of torque transmission of the second engagement mechanism is increased; and (c) increase a torque input into the transmission by the engine based on the decrement in the output torque by controlling the engine.

8 Claims, 6 Drawing Sheets

(51) Int. Cl.
 *B60W 10/06* (2006.01)
 *B60W 10/115* (2012.01)
 *F16H 3/66* (2006.01)

(52) U.S. Cl.
 CPC ........... *B60W 10/115* (2013.01); *F16H 3/663* (2013.01); *B60W 2510/0275* (2013.01); *B60W 2510/1005* (2013.01); *B60W 2510/105* (2013.01); *B60W 2710/021* (2013.01); *B60W 2710/0666* (2013.01); *B60W 2710/1022* (2013.01); *B60W 2710/1083* (2013.01); *F16H 2200/006* (2013.01); *F16H 2200/0086* (2013.01); *F16H 2200/2007* (2013.01); *F16H 2200/2023* (2013.01); *F16H 2200/2043* (2013.01); *F16H 2200/2064* (2013.01); *F16H 2200/2094* (2013.01); *F16H 2200/2097* (2013.01)

(56) References Cited

U.S. PATENT DOCUMENTS

| | | | |
|---|---|---|---|
| 2005/0202926 A1* | 9/2005 | Antonov | F16D 43/10 475/293 |
| 2010/0056312 A1* | 3/2010 | Akutsu | B60K 6/365 475/1 |
| 2010/0131160 A1* | 5/2010 | Ayabe | F02D 31/007 701/54 |
| 2010/0173746 A1* | 7/2010 | Ideshio | B60K 6/365 477/36 |

* cited by examiner

| TRANSMISSION STAGE | C1 | C2 | C3 | C4 | B1 | B2 |
|---|---|---|---|---|---|---|
| 1st | O | – | – | – | – | O |
| 2nd | O | – | – | – | O | – |
| 3rd | O | – | O | – | – | – |
| 4th | O | – | – | O | – | – |
| 5th | O | O | – | – | – | – |
| 6th | – | O | – | O | – | – |
| 7th | – | O | O | – | – | – |
| 8th | – | O | – | – | O | – |
| Revs1 | – | – | O | – | – | O |
| Revs2 | – | – | – | O | – | O |

O: ENGAGED
–: RELEASED

CONTROL DEVICE FOR VEHICLE

CROSS-REFERENCE TO RELATED APPLICATIONS

This is a national phase application based on the PCT International Patent Application No. PCT/IB2015/001164 filed Jun. 24, 2015, claiming priority to Japanese Patent Application No. 2014-139054 filed Jul. 4, 2014, the entire contents of both of which are incorporated herein by reference.

BACKGROUND OF THE INVENTION

1. Field of the Invention

The invention relates to a control device for a vehicle that is provided with a transmission which includes a first engagement mechanism transmitting a torque by meshing and a second engagement mechanism capable of changing a transmission torque capacity.

2. Description of Related Art

Japanese Patent Application Publication No. 2002-174335 (JP 2002-174335 A) discloses a control device for a transmission that is configured to change a torque which is output from an engine and transmit the changed torque to a drive wheel. The transmission is provided with a power transmission path through which the torque is transmitted from an input shaft to an output shaft via a dog clutch and a power transmission path through which the torque is transmitted from the input shaft to the output shaft via a friction clutch. Accordingly, the torque that acts on the dog clutch is gradually reduced as a result of an increase in the transmission torque capacity of the friction clutch, and thus the release of the dog clutch is initiated after the transmission torque capacity of the friction clutch rises to some extent in a case where the dog clutch is released.

The timing when the release of the dog clutch begins can be determined by using the length of time elapsed after the transmission torque capacity of the friction clutch begins to be increased. However, the friction clutch, the dog clutch, or a device that controls these members has inevitable irregularities. Accordingly, the length of time taken to reach a state where the dog clutch can be released after the transmission torque capacity of the friction clutch begins to be increased has inevitable irregularities. Accordingly, the torque continues to act on the dog clutch and the release of the dog clutch cannot be ensured in some cases when the timing of the beginning of the release of the dog clutch is determined based on the length of time after the transmission torque capacity of the friction clutch begins to be increased. Accordingly, the transmission control device that is disclosed in JP 2002-174335 A is configured to detect the transmission torque capacity of the friction clutch and determine whether or not to release the dog clutch based on the detected transmission torque capacity.

In a transmission that is configured to perform switching between a transmission stage which is set by dog clutch engagement and a transmission stage which is set by friction clutch engagement, the torque that acts on the dog clutch can be reduced by increasing the transmission torque capacity of the friction clutch as disclosed in JP 2002-174335 A. Accordingly, no torque acts on the dog clutch when the transmission torque capacity of the friction clutch is increased to a predetermined value. When the transmission torque capacity of the friction clutch is further increased, the torque is transmitted with the meshing of the dog clutch reversed. The torque is transmitted to the dog clutch when the meshing of the dog clutch is reversed by the transmission torque capacity of the friction clutch being increased as described above.

SUMMARY OF THE INVENTION

The torque that is transmitted to an output member may be reduced when the transmission torque capacity of the friction clutch is increased to the extent that the meshing of the dog clutch is reversed. Accordingly, in the transmission control device that is configured to perform shifting by increasing the transmission torque capacity of the friction clutch so that the meshing of the dog clutch is reversed, the torque that is transmitted to the output member during the shifting may be reduced. The invention provides a control device for a vehicle that is capable of suppressing a reduction in a driving force during the release of a mesh-type engagement mechanism.

According to an aspect of the invention, a control device for a vehicle is provided. The vehicle includes a transmission and an engine configured to input a torque into the transmission. The transmission has multiple transmission stages and includes a first engagement mechanism and a second engagement mechanism. The first engagement mechanism includes a first member and a second member. The first member is provided with first dog teeth. The first dog teeth include first tooth surfaces directed to one side in a circumferential direction and second tooth surfaces directed to the other side in the circumferential direction. The second member is provided with second dog teeth. The second dog teeth include third tooth surfaces facing the first tooth surfaces and fourth tooth surfaces facing the second tooth surfaces. The second member is configured to be moved in an axial direction such that the second dog teeth mesh with the first dog teeth. The first engagement mechanism is configured to transmit a torque between the first member and the second member when the second dog teeth mesh with the first dog teeth. The second engagement mechanism includes a third member and a fourth member. The second engagement mechanism is configured to perform switching between a state where the third member and the fourth member rotate relative to each other and a state where the third member and the fourth member are connected to each other for torque transmission. The second engagement mechanism is configured to change the capacity of the torque transmission between the third member and the fourth member during the connection. The transmission is configured to select a first transmission stage among the plurality of transmission stages by engaging the first engagement mechanism and releasing the second engagement mechanism. The transmission is configured to select a second transmission stage having a transmission ratio lower than the transmission ratio of the first transmission stage by releasing the first engagement mechanism and engaging the second engagement mechanism. The transmission is configured to reverse the direction of a torque acting on the first member or the second member as a result of an increase in the transmission torque capacity of the second engagement mechanism when the second engagement mechanism is engaged. The first tooth surfaces and the third tooth surfaces are inclined surfaces such that a thrust for separating the first member and the second member from each other in the axial direction is generated in accordance with a torque in a direction in which the first tooth surfaces and the third tooth surfaces are brought into contact with each other when the second transmission stage is set. The control device includes an electronic control unit (ECU). The ECU is configured to:

(a) control the second engagement mechanism when the second transmission stage is set such that the transmission torque capacity of the second engagement mechanism is increased and the thrust for separating the first member and the second member from each other in the axial direction is generated; (b) calculate a decrement in an output torque of the transmission when the transmission torque capacity of the second engagement mechanism is increased; and (c) increase the torque input into the transmission by the engine based on the decrement in the output torque by controlling the engine.

In the control device according to the aspect described above, the ECU may be configured to control the transmission torque capacity of the second engagement mechanism based on the input torque of the transmission when the second transmission stage is set.

In the control device according to the aspect described above, the ECU may be configured to calculate a length of time required for separating the second member from the first member when the second transmission stage is set, and the ECU may be configured to obtain the decrement in the output torque of the transmission based on the obtained length of time.

In the control device according to the aspect described above, the first engagement mechanism may include a brake mechanism.

In the control device according to the aspect described above, the first member and the second member may be configured to rotate relative to each other. The first engagement mechanism may be configured to connect the first member and the second member to each other for integral rotation with the first dog teeth and the second dog teeth meshing with each other.

In the control device according to the aspect described above, the first engagement mechanism may include a thrust generation mechanism configured to control a load for pressing the second member to the first member side. The thrust generation mechanism may be configured to reduce the load by which the second member is pressed to the first member side when the second transmission stage is set.

In the control device according to the aspect described above, the transmission may include a third engagement mechanism engaged when the first transmission stage is set and when the second transmission stage is set.

In the control device according to the aspect described above, the transmission may include a first planetary gear mechanism and a second planetary gear mechanism. Each of the first planetary gear mechanism and the second planetary gear mechanism may include at least three rotating elements. The first engagement mechanism and the second engagement mechanism may be configured to connect the rotating elements of any one of the first planetary gear mechanism and the second planetary gear mechanism to each other or fix the rotating elements of any one of the first planetary gear mechanism and the second planetary gear mechanism.

According to the aspect described above, the transmission is provided with the first engagement mechanism that connects the first member and the second member to each other to be capable of torque transmission by allowing the meshing of the respective dog teeth formed in the first member and the second member and the second engagement mechanism that is capable of connecting the third member and the fourth member, which rotate relative to each other, to each other to be capable of torque transmission and changing the capacity of the transmitted torque. The first transmission stage is set when the first engagement mechanism is engaged and the second engagement mechanism is released and the second transmission stage, which has a transmission ratio lower than the transmission ratio of the first transmission stage, is set when the first engagement mechanism is released and the second engagement mechanism is engaged. In addition, the direction of the torque that acts on the first member or the second member is gradually reversed as a result of an increase in the transmission torque capacity of the second engagement mechanism. Accordingly, the torque that acts on the first member or the second member is gradually reduced with the increase in the transmission torque capacity of the second engagement mechanism when the first transmission stage is set, and then the direction of the torque that acts on the first member or the second member is reversed. In addition, the first tooth surfaces of the first dog teeth and the second tooth surfaces of the second dog teeth face each other and these tooth surfaces are inclined surfaces generating the thrust for separating the first member and the second member from each other in the axial direction in accordance with the torque in the direction in which these tooth surfaces are brought into contact with each other. When the second transmission stage is set, the transmission torque capacity of the second engagement mechanism is increased so that the torque which acts between the first member and the second member becomes the torque generating the thrust for separating the first member and the second member from each other in the axial direction. Accordingly, the first engagement mechanism can be released and shifting to the second transmission stage can be performed when the transmission torque capacity of the second engagement mechanism is controlled. Accordingly, the control that is performed during the shifting from the first transmission stage to the second transmission stage described above can be simplified.

In addition, a reduction in the torque that is output from the transmission during the release of the first engagement mechanism can be suppressed by obtaining the decrement in the output torque of the transmission during the release of the first engagement mechanism and increasing the torque that is input into the transmission based on the obtained decrement.

Moreover, the decrement in the output torque of the transmission can be obtained in accordance with the length of time required for the release of the first engagement mechanism by calculating the length of time required for separating the second member from the first member during the setting of the second transmission stage and obtaining the decrement in the output torque of the transmission based on the calculated length of time. As a result, a reduction in a driving force during the release of the first engagement mechanism can be suppressed even when the length of time required for the release of the first engagement mechanism is appropriately set.

If the thrust generation mechanism that presses the second member to the first member side is provided, the separation of the respective dog teeth can be suppressed by pressing the second member to the first member side by using the thrust generation mechanism even in a case where the torque is applied to the first tooth surfaces and the third tooth surfaces as the first tooth surfaces and the third tooth surfaces are brought into contact with each other under a condition in which the shifting from the first transmission stage to the second transmission stage is not performed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 4:
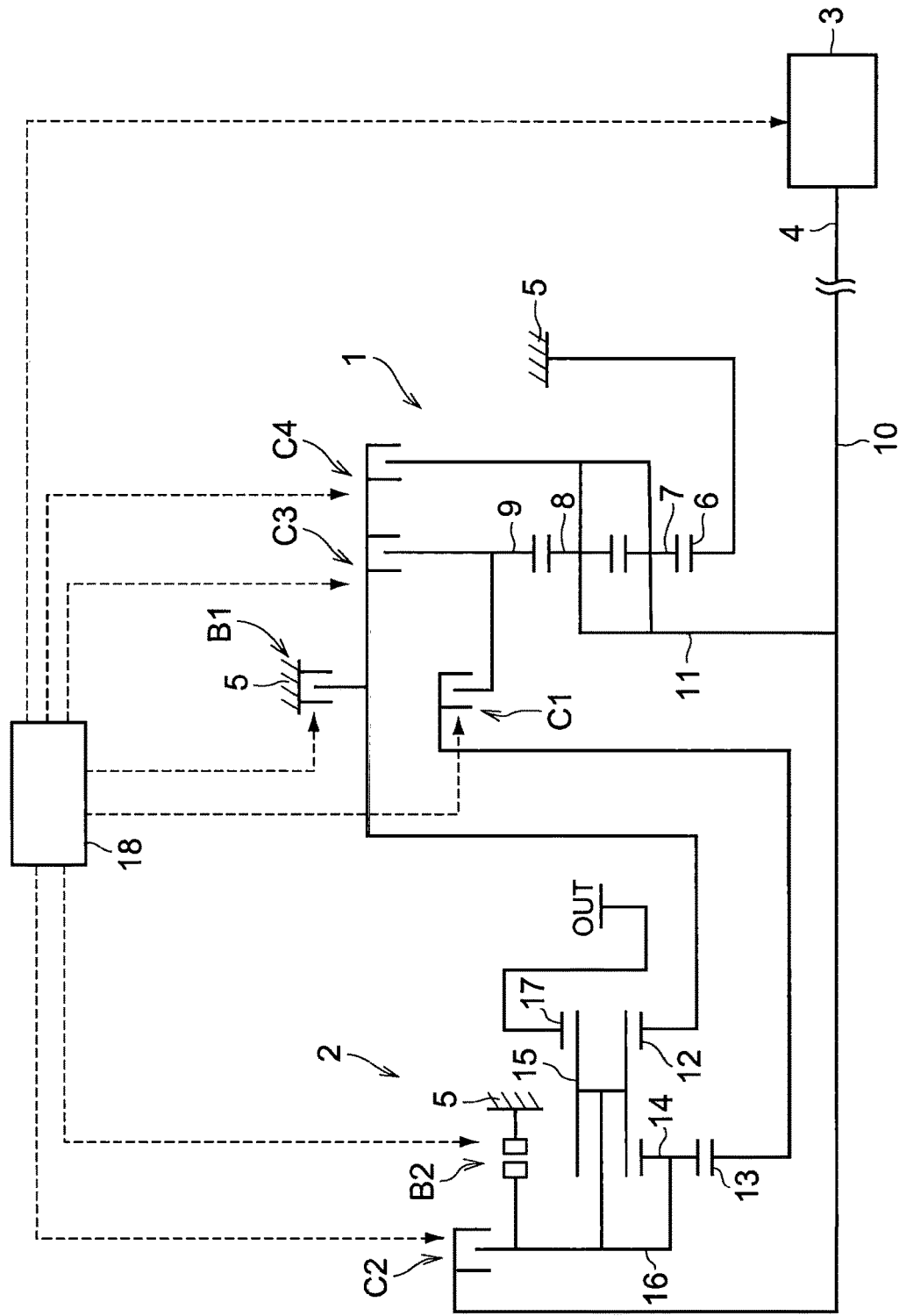
FIG. 4 is a skeleton diagram illustrating an example of the configuration of the transmission that is provided with each engagement mechanism according to the invention.

The invention relates to a control device for a transmission provided with a first engagement mechanism that connects two members to each other to be capable of torque transmission with dog teeth meshing and a second engagement mechanism that is capable of engaging two members, which are disposed to be capable of relative rotation, with each other to be capable of torque transmission and changing the capacity of the transmitted torque. FIG. 4 illustrates an example of the configuration of the transmission that has each of the engagement mechanisms which have the above-described configuration. The transmission that is illustrated in FIG. 4, which is mounted on a vehicle, has a known double pinion-type planetary gear mechanism (hereinafter, referred to as a first planetary gear mechanism 1) and a Ravigneaux-type planetary gear mechanism (hereinafter, referred to as a second planetary gear mechanism 2). This transmission is connected to an output shaft 4 of an engine 3, which is a driving force source, via a torque converter (not illustrated) and is configured to output a torque after changing an input torque and a rotation speed. More specifically, this transmission is configured to be capable of setting transmission stages of a forward first speed to a forward eighth speed and transmission stages of a reverse first speed and a reverse second speed and is configured to set any of the transmission stages in accordance with a target rotation speed of the engine 3, a required driving force, and the like. These planetary gear mechanisms correspond to the first planetary gear mechanism and the second planetary gear mechanism pertaining to the case of the implementation of the invention.

The configuration of the transmission that is illustrated in FIG. 4 will be described in detail. A first sun gear 6 that is connected to a fixed portion 5 such as a housing, a first inner pinion gear 7 that meshes with the first sun gear 6, a first outer pinion gear 8 that meshes with the first inner pinion gear 7, a first ring gear 9 that meshes with the first outer pinion gear 8, and a first carrier 11 that holds the first inner pinion gear 7 and the first outer pinion gear 8 to be capable of rotation and revolution and is connected to an input shaft 10 constitute the first planetary gear mechanism 1. In other words, the first planetary gear mechanism 1 is a differential mechanism that has three rotating elements and is configured for the first carrier 11 to function as an input element, for the first sun gear 6 to function as a reaction force element, and for the first ring gear 9 to function as an output element when the engine 3 outputs a driving force. In addition, the first planetary gear mechanism 1 functions as a decelerator.

A second sun gear 12 and a third sun gear 13 that are concentrically arranged with the input shaft 10, a second inner pinion gear 14 that meshes with the third sun gear 13, a second outer pinion gear 15 that meshes with the second inner pinion gear 14 and the second sun gear 12, a second carrier 16 that holds the second inner pinion gear 14 and the second outer pinion gear 15 to be capable of rotation and revolution, and a second ring gear 17 that meshes with the second outer pinion gear 15 constitute the second planetary gear mechanism 2 that is illustrated in FIG. 4. In other words, the second planetary gear mechanism 2 is configured to have both the second carrier 16 and the second ring gear 17 of a single pinion-type planetary gear mechanism and a double pinion-type planetary gear mechanism and is configured as a differential mechanism that has the four rotating elements of the second sun gear 12, the third sun gear 13, the second carrier 16, and the second ring gear 17.

A plurality of clutches for selective engagement between the respective rotating elements of the first planetary gear mechanism 1 described above and the respective rotating elements of the second planetary gear mechanism 2 and a brake for stopping any of the rotating elements are additionally disposed. Specifically, a first clutch C1 is disposed to connect the first ring gear 9 and the third sun gear 13 to each other, a second clutch C2 is disposed to connect the input shaft 10 or the first carrier 11 and the second carrier 16 to each other, a third clutch C3 is disposed to connect the first ring gear 9 and the second sun gear 12 to each other, and a fourth clutch C4 is disposed to connect the first carrier 11 and the second sun gear 12 to each other. Each of the clutches C1, C2, C3, C4 is configured to be capable of changing the transmission torque capacity based on the amount of the control of a hydraulic actuator, an electromagnetic actuator, or the like. In the following description, a friction clutch that is configured to transmit the torque by using a frictional force and changing the transmission torque capacity in accordance with the hydraulic pressure which is supplied to the hydraulic actuator will be described as an example.

In addition, a first brake B1 is disposed to stop the second sun gear 12 by connecting the fixed portion 5 such as the housing and the second sun gear 12 to each other. Likewise, a second brake B2 is disposed to stop the second carrier 16 by connecting the fixed portion 5 and the second carrier 16 to each other. In the example that is illustrated in FIG. 4, a friction brake that is capable of controlling a braking force which acts on the second sun gear 12 by changing the frictional force, that is, by changing the transmission torque capacity, constitutes the first brake B1 and the second brake B2 is configured to stop the second carrier 16 when the second carrier 16 and the fixed portion 5 mesh with each other. The second brake B2 corresponds to the first engagement mechanism pertaining to the case of the implementation of the invention.

An electronic control unit (hereinafter, referred to as an ECU 18) is also disposed so as to control the engine 3, each engagement device, and the like. The ECU 18 is configured to have a microcomputer as a main component as is known, and is configured to determine a signal to be output to the engine 3 or the respective engagement devices based on a signal that is input from a sensor (not illustrated), a pre-stored map, a pre-stored arithmetic expression, and the like and output the determined signal to the engine 3 and the respective engagement devices. As an example thereof, signals of a vehicle speed that is detected by a vehicle speed sensor and an accelerator opening that is detected by an accelerator opening sensor are input into the ECU 18. As is known, a shift map that is prepared in advance by using the vehicle speed and the accelerator opening as parameters is stored in the ECU 18, and the transmission stage is determined by using the input signals and the shift map. Then, the signal is output to the respective clutches and the respective brakes described above so that the transmission stage which is determined is attained. In this case, the transmission torque capacity of the friction clutch, the friction brake, or the like is controlled in accordance with various conditions so as to, for example, suppress a shock that is caused when the transmission stage is changed.

Figures 5, 6:
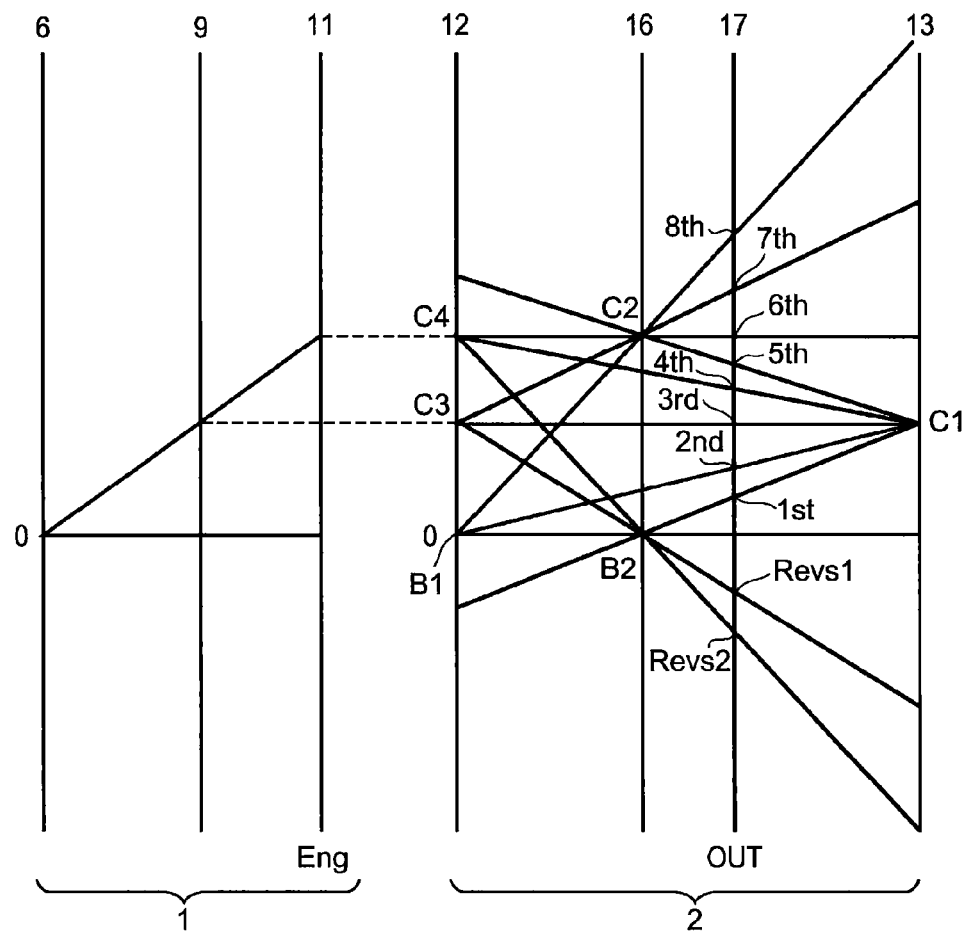
FIG. 5 is an engagement table illustrating which engagement mechanism is engaged when each transmission stage is set.
FIG. 6 is a nomogram illustrating the operation state of each rotating element of the transmission.

The engagement table in FIG. 5 illustrates which engagement mechanism is engaged when each transmission stage is set. "o" in FIG. 5 represents a state where the clutch or the brake is engaged, and "-" represents a state where the clutch or the brake is released. As illustrated in FIG. 5, the forward first speed is set when the first clutch C1 and the second brake B2 are engaged, the forward second speed is set when the first clutch C1 and the first brake B1 are engaged, the forward third speed is set when the first clutch C1 and the third clutch C3 are engaged, the forward fourth speed is set when the first clutch C1 and the fourth clutch C4 are engaged, the forward fifth speed is set when the first clutch C1 and the second clutch C2 are engaged, the forward sixth speed is set when the second clutch C2 and the fourth clutch C4 are engaged, the forward seventh speed is set when the second clutch C2 and the third clutch C3 are engaged, and the forward eighth speed is set when the second clutch C2 and the first brake B1 are engaged. In addition, the reverse first speed is set when the second brake B2 and the third clutch C3 are engaged and the reverse second speed is set when the second brake B2 and the fourth clutch C4 are engaged. The transmission ratio is "1" when the forward sixth speed is set, the transmission ratio exceeds "1" when any one of the transmission stages of the forward first speed to the forward fifth speed is set, and the transmission ratio is less than "1" when the forward seventh speed or the forward eighth speed is set. The forward first speed corresponds to the first transmission stage pertaining to the case of the implementation of the invention, the forward second speed corresponds to the second transmission stage pertaining to the case of the implementation of the invention, the first brake B1 corresponds to the second engagement mechanism pertaining to the case of the implementation of the invention, and the first clutch C1 corresponds to the third engagement mechanism pertaining to the case of the implementation of the invention.

FIG. 6 is a nomogram illustrating the operation state of each rotating element in the respective transmission stages. The vertical axis in FIG. 6 represents the rotation speed of each rotating element, and the rotation speed input into the transmission is illustrated as being constant. In the following description, a case where the direction of rotation of each rotating element is the same as the direction of rotation of the engine 3 will be referred to as positive rotation and a case where the direction of rotation of each rotating element is opposite to the direction of rotation of the engine 3 will be referred to as negative rotation. In addition, a torque that acts to reduce the rotation speed during the negative rotation or a torque that acts to increase the rotation speed during the positive rotation will be referred to as a positive torque and a torque that acts to reduce the rotation speed during the positive rotation or a torque that acts to increase the rotation speed during the negative rotation will be referred to as a negative torque. Accordingly, in FIG. 6, the positive rotation is the side above "0", the negative rotation is the side below "0", the torque that acts in the upward direction with respect to each rotating element is the positive torque, and the torque that acts in the downward direction with respect to each rotating element is the negative torque.

As described above, the first planetary gear mechanism 1 is configured to function as the decelerator and is configured to amplify the torque that is transmitted from the engine 3 and then output the amplified torque from the first ring gear 9. In addition, the first clutch C1 is engaged at the forward first speed. In other words, the first ring gear 9 and the third sun gear 13 are connected to each other via the first clutch C1 as described above. Accordingly, the positive torque is input from the engine 3 to the third sun gear 13 via the first ring gear 9, and thus the third sun gear 13 functions as the input element of the second planetary gear mechanism 2. At the forward first speed, in addition, the second brake B2 is engaged to connect the second carrier 16 and the fixed portion 5 to each other, and thus the rotation speed of the second carrier 16 is maintained at "0". Accordingly, the second carrier 16 functions as the reaction force element of the second planetary gear mechanism 2. As a result, the torque that is input into the transmission is amplified in accordance with the gear ratio of the transmission and then is output from the second ring gear 17. The negative torque is transmitted to the second carrier 16 while the driving force is output from the engine 3.

The first clutch C1 is engaged not only at the forward first speed but also at the forward second speed. Accordingly, the positive torque is input from the engine 3 to the third sun gear 13 via the first ring gear 9, and thus the third sun gear 13 functions as the input element of the second planetary gear mechanism 2. At the forward second speed, the first brake B1 is engaged to connect the second sun gear 12 and the fixed portion 5 to each other, and thus the rotation speed of the second sun gear 12 is maintained at "0". Accordingly, the second carrier 16 functions as the reaction force element of the second planetary gear mechanism 2. As a result, the torque that is input into the transmission is amplified in accordance with the gear ratio of the transmission and then is output from the second ring gear 17.

During the upshift to the forward second speed from the forward first speed set as described above, the second brake B2 is released and the first brake B1 is engaged. As described above, the second brake B2 is configured to transmit the torque by meshing. The brake that transmits the torque by meshing as described above cannot control the transmission torque capacity. Accordingly, a large amount of torque is applied to the second brake B2 and a large amount of frictional force acts on the meshing surface while the second carrier 16 is functioning as the reaction force element, and thus the second brake B2 becomes less likely to be released in some cases. Accordingly, this transmission control device is configured for the second brake B2 to be released in a state where the transmission torque capacity of the first brake B1 is increased to be allowed to function as a reaction force at the forward first speed. In other words, this transmission control device is configured for the negative torque that is applied to the second brake B2 to be reduced when the traveling is performed with the forward first speed set.

It is necessary to determine whether the second brake B2 is completely released in the case of performing a transition to the forward second speed by increasing the transmission torque capacity of the first brake B1 so as to suppress the application of the torque to the second brake B2, releasing the second brake B2 thereafter, and then increasing the transmission torque capacity of the first brake B1. When a sensor or the like is disposed so as to detect a complete release of the second brake B2, the device may become larger in size, or the shift response may be reduced due to a factor such as the waiting for the release of the second brake B2. In addition, the shift control may become complicated because cooperation control has to be performed between control for releasing the second brake B2 and control for changing the transmission torque capacity of the first brake B1.

Figure 7:
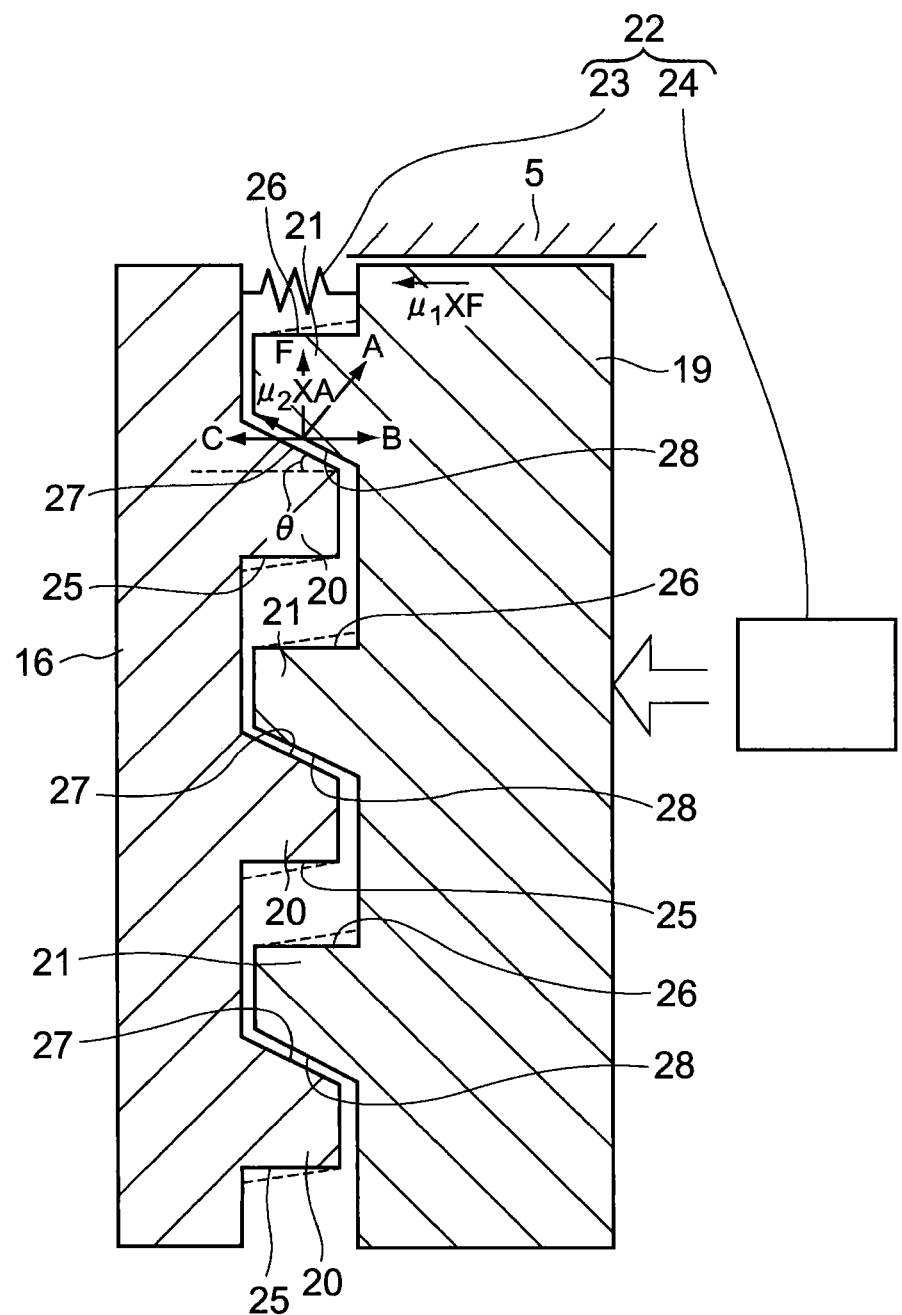
FIG. 7 is a cross-sectional view for showing an example of the configuration of the second brake.

Accordingly, the invention is configured to allow the second brake B2 to be released by increasing the transmission torque capacity of the first brake B1 so that the positive torque is transmitted to the second carrier 16. FIG. 7 is a schematic diagram for showing the configuration of the second brake B2. The second brake B2 that is illustrated in FIG. 7 is configured for a piston 19, which is spline-engaged with the fixed portion 5, and the second carrier 16 to mesh with each other. Specifically, a side surface of the second carrier 16 and the piston 19 are disposed to face each other in an axial direction, a plurality of first dog teeth 20 that protrude in the axial direction are formed at predetermined intervals in a circumferential direction on the surface of the second carrier 16 facing the piston 19, and a plurality of second dog teeth 21 that protrude in the axial direction and mesh with the first dog teeth 20 are formed at predetermined intervals in the circumferential direction on the surface of the piston 19 facing the second carrier 16. The piston 19, which is an annularly formed member, has an outer circumferential surface that is spline-engaged with an inner circumferential surface of the fixed portion 5. In other words, the piston 19 is engaged with the fixed portion 5 to be capable of moving in the axial direction and not to be capable of rotating. The piston 19 corresponds to the second member pertaining to the case of the implementation of the invention.

A thrust generation mechanism 22 is disposed so as to move the piston 19. In the example that is illustrated in FIG. 7, a return spring 23 that exerts a load on the piston 19 so that the piston 19 is separated from the second carrier 16 and a hydraulic actuator 24 that is disposed on a back surface (surface on the side opposite to the surface facing the second carrier 16) side of the piston 19 so as to exert a thrust against the spring force of the return spring 23 constitute the thrust generation mechanism 22. Accordingly, the piston 19 that is illustrated in FIG. 7 is configured to approach the second carrier 16 when the hydraulic pressure supplied to the hydraulic actuator 24 increases and, on the contrary, to be separated from the second carrier 16 by the spring force of the return spring 23 when the hydraulic pressure supplied to the hydraulic actuator 24 decreases.

The respective dog teeth 20, 21 that are illustrated in FIG. 7 have tooth surfaces formed so that the hydraulic pressure supplied to the hydraulic actuator 24 can be reduced when the driving force is transmitted from the engine 3 with the forward first speed set, that is, the thrust for separation from the second carrier 16 is less likely to be generated in the piston 19 when the first cog teeth 20 and the second dog teeth 21 are in contact with each other. Specifically, the side surfaces of the dog teeth 20, 21 that are in contact with each other while the vehicle is traveling with the forward first speed set, that is, tooth surfaces 25, 26 where the first dog teeth 20 and the second dog teeth 21 face each other, are formed to be substantially orthogonal to the direction of rotation. The tooth surfaces 25 of the first dog teeth 20 correspond to the second tooth surfaces pertaining to the case of the implementation of the invention and the tooth surfaces 26 of the second dog teeth 21 correspond to the fourth tooth surfaces pertaining to the case of the implementation of the invention. Although the respective tooth surfaces 25, 26 are formed to be orthogonal to the direction of rotation in the example that is illustrated in FIG. 7, the respective tooth surfaces 25, 26 may also be formed at a predetermined angle to the direction of rotation as illustrated by the dashed line.

The negative torque that is transmitted to the second carrier 16 is reduced first when the transmission torque capacity of the first brake B1 begins to be increased during the setting of the forward first speed. When the transmission torque capacity of the first brake B1 is further increased thereafter, the torque that is transmitted to the second carrier 16 is reversed in direction to become the positive torque. In other words, an increase in the transmission torque capacity of the first brake B1 causes the direction of the torque that is transmitted to the second carrier 16 to be gradually reversed. When the direction of the torque that is transmitted to the second carrier 16 is reversed as described above, the meshing between the dog teeth 20, 21 is reversed. Accordingly, this transmission control device is configured for the meshing between the dog teeth 20, 21 to be reversed and the thrust for separating the piston 19 from the second carrier 16 to be generated in accordance with the torque in the direction in which tooth surfaces 27, 28 are brought into contact with each other. Specifically, the tooth surfaces 27, 28 are inclined which are brought into contact with each other with the reversal of the meshing between the respective dog teeth 20, 21. In other words, the tooth surfaces 27, 28 that are directed to be opposite to the tooth surfaces 25, 26 in the circumferential direction are formed to be inclined. These tooth surfaces 27, 28 correspond to the first tooth surface and the third tooth surface pertaining to the case of the implementation of the invention.

The shapes of the tooth surfaces 27, 28 will be described in detail. The respective dog teeth 20, 21 are formed for the angle $\theta$ that is formed by the axial direction and the respective tooth surfaces 27, 28 to exceed a predetermined value, that is, configured for a load to act on the piston 19 in the direction in which the piston 19 is separated from the second carrier 16 in accordance with the torque which is applied to the respective tooth surfaces 27, 28 as a result of the contact between the respective tooth surfaces 27, 28. It is preferable that this inclination angle $\theta$ is set to an angle which satisfies the following expression.

$$B - C - \mu_1 \times F > 0 \qquad (1)$$

The B in the Expression (1) represents the load that acts on the piston 19 so as to separate the piston 19 from the second carrier 16 when a load acts on the tooth surfaces 28. In other words, the B in the Expression (1) can be calculated based on a normal force A that is applied to the tooth surfaces 28 and the inclination angle $\theta$. Specifically, the B in the Expression (1) can be calculated as follows. The F in the following equation represents the load in the direction of rotation acting on the piston 19.

$$B = A \times \sin\theta \qquad (2)$$

$$A = F/\cos\theta \qquad (3)$$

Since the frictional force is generated when the piston 19 is moved in the axial direction, the axial component of the frictional force acts on the piston 19. The C in the Expression (1) represents the axial component of the frictional force. Accordingly, the C can be obtained by the following equation. The $\mu_2$ in the following equation represents the coefficient of friction in the contact surfaces of the respective dog teeth 20, 21.

$$C = \mu_2 \times A \times \cos\theta \tag{4}$$

In addition, the "$\|_1 \times F$" in the Expression (1) represents the frictional force that is caused by the piston 19 and the fixed portion 5, and the $\mu_1$ represents the coefficient of friction in the contact surfaces of the piston 19 and the fixed portion 5.

Accordingly, the Expression (1) shows a condition in which the piston 19 can be moved in a case where the torque is applied to the respective tooth surfaces 27, 28 in a state where the thrust generation mechanism 22 does not press the piston 19. Because the return spring 23 always presses the piston 19, the spring force of the return spring 23 may be added to the left-hand side of the Expression (1).

When the second brake B2 has the above-described configuration, it is possible to allow the load to act on the piston 19 and release the second brake B2 by controlling the torque that is transmitted by the first brake B1. Specifically, when the transmission torque capacity of the first brake B1 is increased with the forward first speed set, the first brake B1 is in charge of a reaction force torque corresponding to the transmission torque capacity. Accordingly, the torque that is applied to the second brake B2 is gradually reduced. In other words, the first brake B1 and the second brake B2 are in charge of the reaction force torque. When the transmission torque capacity of the first brake B1 is further increased, the positive torque is transmitted to the second carrier 16 and the direction of the meshing of the second brake B2 is reversed. When the direction of the meshing of the second brake B2 is reversed as described above, the tooth surfaces 27, 28 are brought into contact with each other and the second brake B2 is released. Even when the meshing of the second brake B2 is reversed, the rotation speed of each rotating element does not change until the second brake B2 is released. Accordingly, the first brake B1 is in a slip state. In addition, the separation of the piston 19 from the second carrier 16 can be suppressed, because the thrust generation mechanism 22 is provided, although the load acts on the second brake B2 to release the piston 19 during reverse traveling or an engine brake operation. In other words, another friction brake or the like does not have to be disposed.

In a case where the second brake B2 is released by the application of the torque to the second brake B2 and the separation of the piston 19 as described above, the second carrier 16 remains stopped while the torque is exerted to release the piston 19. Accordingly, the positive torque is transmitted to the second sun gear 12 while the transmission torque capacity of the first brake B1 is increased and the piston 19 is released, and thus the negative torque corresponding to the transmission torque capacity of the first brake B1 is transmitted to the second ring gear 17. In other words, the torque that is transmitted from the engine 3 to the second ring gear 17 is reduced.

Accordingly, this transmission control device is configured to suppress a reduction in the torque that is transmitted to the second ring gear 17 by increasing the torque that is input into the transmission, more specifically, the output torque of the engine 3, while the torque is applied to the second brake B2 to release the second brake B2. When only the torque that is input into the transmission is increased as described above, the engine 3 is blown and to the torque for releasing the second brake B2 becomes less likely to be exerted. Accordingly, this transmission control device is configured to increase the transmission torque capacity of the first brake B1 in accordance with the increment in the torque that is input into the transmission.

Specifically, the output torque of the engine 3 is calculated by using the following arithmetic expression. Firstly, as is known, a torque To that is transmitted to the second ring gear 17 can be expressed in the form of a function based on the torque (hereinafter, referred to as a turbine torque TT) that is transmitted to the input shaft 10, a transmission torque Tb1 of the first brake B1, and a transmission torque Tb2 of the second brake B2 as represented by the Equation (5) by using an equation of motion for the shifting from the forward first speed to the forward second speed. Likewise, the angular acceleration $d\omega/dt$ of the second ring gear 17 can be expressed in the form of a function based on the turbine torque TT, the transmission torque Tb1 of the first brake B1, and the transmission torque Tb2 of the second brake B2 as represented by the Equation (6). Each of the $\alpha_1$, $\beta_1$, $\gamma_1$, $\alpha_2$, $\beta_2$, and $\gamma_2$, which are coefficients, is a value that is determined based on the structure of the transmission, inertia, and the like.

$$To = \alpha_1 \times TT + \beta_1 \times Tb1 + \gamma_1 \times Tb2 \tag{5}$$

$$d\omega/dt = \alpha_2 \times TT + \beta_2 \times Tb1 + \gamma_2 \times Tb2 \tag{6}$$

When the torque of the first brake B1 is controlled so that no torque is applied to the second brake B2 in a state where the forward first speed is set, a torque To_org that is transmitted to the second ring gear 17 and the angular acceleration $d\omega/dt$ of the second ring gear 17 can be expressed in the form of the functions shown by the Equation (7) and the Equation (8) because the transmission torque of the second brake B2 in the Equation (5) and the Equation (6) may be "0". Since the shifting is performed within an extremely short period of time, the rotation speed of the second ring gear 17 rarely changes during the shift. Accordingly, the value of the Equation (8) is "0".

$$To\_org = \alpha_1 \times TT\_org + \beta_1 \times Tb1\_org \tag{7}$$

$$d\omega/dt = \alpha_2 \times TT\_org + \beta_2 \times Tb1\_org = 0 \tag{8}$$

In the Equation (7), Equation (8), and the following description, the transmission torque of the first brake B1 that prevents torque application to the second brake B2 is referred to as "Tb1_org" and the torque that is input into the transmission is referred to as "TT_org".

Accordingly, the transmission torque Tb1_org of the first brake B1 that is required for the transmission torque of the second brake B2 to become "0" may be solved for the "Tb1_org" in the Equation (8), and thus can be expressed in the form of the function of the "TT_org" as in the Equation (9). In addition, the torque To_org that is transmitted to the second ring gear 17 in this case can be expressed in the form of the function of the "TT_org" as in the Equation (10) similarly to the transmission torque Tb1_org of the first brake B1. The "Tb1_org" in the Equation (9) may be substituted in the Equation (7). Herein, the turbine torque TT_org is a value based on the output torque of the engine 3 and the torque ratio of the torque converter. Accordingly, the transmission torque Tb1_org of the first brake B1 and the torque To_org that is transmitted to the second ring gear 17 can be determined based on the required driving force as is known.

$$Tb1\_org = -\alpha_2/\beta_2 \times TT\_org \quad (9)$$

$$To\_org = (\alpha - \alpha_2 \times \beta_1/\beta_2) \times TT\_org \quad (10)$$

This transmission control device is configured to release the second brake B2 by the application of the torque to the second brake B2 as described above and is configured to output a torque corresponding to the driving force decrement attributable to the above-described torque application to the second brake B2 from the engine 3 and determine the transmission torque of the first brake B1 in accordance with the output torque of the engine 3. Accordingly, the torque that is transmitted to the second ring gear 17 and the angular acceleration of the second ring gear 17 while the torque for releasing the second brake B2 is applied to the second brake B2 can be expressed in the form of the functions shown in the Equation (11) and the Equation (12). Since the output torque of the engine 3 is increased not to change the driving force as described above, the torque that is transmitted to the second ring gear 17 has a value similar to that in the Equation (7), that is, becomes equal to the "To_org". In the following description, the torque that is output by the engine 3 so as to supplement the driving force decrement when the second brake B2 is released, that is, the torque corresponding to the turbine torque increment, will be referred to as "TT_add", the increment in the transmission torque of the first brake B1 corresponding to the turbine torque increment will be referred to as "Tb1_add", and the torque that is transmitted to the second brake B2 will be referred to as "-Tb2_need".

$$To\_org = \alpha_1 \times (TT\_org + TT\_add) + \beta_1 \times (Tb1\_org + Tb1\_add) + \gamma_1 \times (-Tb2\_need) \quad (11)$$

$$d\omega/dt = \alpha_2 \times (TT\_org + TT\_add) + \beta_2 \times (Tb1\_org + Tb1\_add) + \gamma_2 \times (-Tb2\_need) = 0 \quad (12)$$

Figure 2:
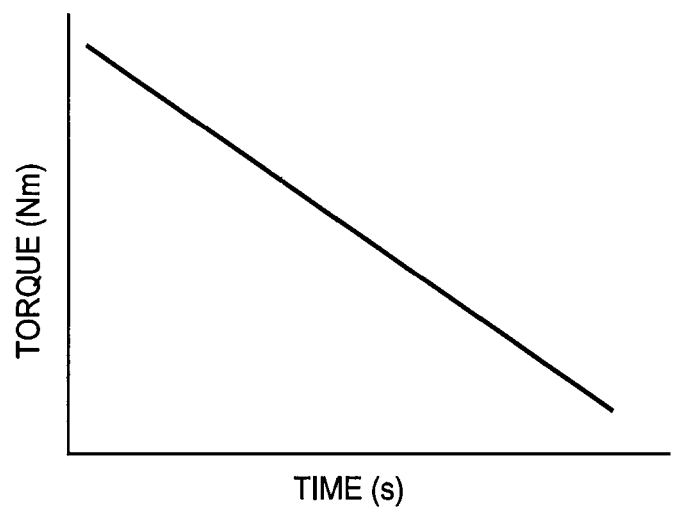
FIG. 2 is a map for determining a torque that is applied to a second brake so as to release a piston.

The $\gamma_1 \times (-Tb2\_need)$ in the Equation (11) represents the torque that is transmitted to the second ring gear 17 so as to reduce the torque transmitted from the engine 3 to the second ring gear 17, which is attributable to the release of the second brake B2. The torque that is transmitted to the second ring gear 17 can be calculated based on the length of time required until the respective dog teeth 20, 21 are released after the contact between the tooth surfaces 27, 28. Specifically, the second brake B2 is released by the piston 19 being pressed in the axial direction in accordance with the torque applied to the second brake B2 as described above. In addition, the axial length of the meshing between the respective dog teeth 20, 21 is determined on a design basis. Accordingly, the torque applied to the second brake B2 can be obtained based on the axial length of the meshing between the respective dog teeth 20, 21 and the length of time required until the piston 19 is moved, that is, the required shift response. Then, the negative torque that is transmitted to the second ring gear 17, which is attributable to the release of the second brake B2, can be calculated by integrating the torque applied to the second brake B2 that is obtained in this manner with the coefficient $\gamma_1$ in the Equation (11). The torque that acts on the second brake B2 may be obtained by preparing, in advance, a map which has the length of time taken until the release of the second brake B2, more specifically, the length of time taken until a complete separation after the piston 19 begins to be pressed, and the torque that acts on the second brake B2 as parameters as illustrated in FIG. 2 and in accordance with the map and the length of time taken until the release of the second brake B2.

A reduction in the driving force caused when the second brake B2 is released by the application of the torque to the second brake B2 is suppressed as described above, and thus the torque that is transmitted to the second ring gear 17 in a state where no torque is applied to the second brake B2 becomes equal to the torque that is transmitted to the second ring gear 17 when the torque is applied to the second brake B2. In other words, the Equation (7) above and the Equation (11) above are identical to each other. Accordingly, the Equation (13) is obtained from the Equation (7) and the Equation (11).

$$\alpha_1 \times TT\_add + \beta_1 \times Tb1\_add + \gamma_1 \times (-Tb2\_need) = 0 \quad (13)$$

Likewise, the angular acceleration of the second ring gear 17 in a state where no torque is applied to the second brake B2 becomes equal to the angular acceleration of the second ring gear 17 in a state where the torque is applied to the second brake B2. Accordingly, the Equation (14) is obtained from the Equation (8) and the Equation (12).

$$\alpha_2 \times TT\_add + \beta_2 \times Tb1\_add + \gamma_2 \times (-Tb2\_need) = 0 \quad (14)$$

Accordingly, from the Equation (13) and the Equation (14), the turbine torque increment TT_add can be expressed, as in the Equation (15), in the form of the function of the torque applied to the second brake B2 so as to release the second brake B2.

$$TT\_add = (\gamma_1 \times \beta_2 - \gamma_2 \times \beta_1)/(\alpha_1 \times \beta_2 - \alpha_2 \times \beta_1) \times (-Tb2\_need) \quad (15)$$

Likewise, from the Equation (13) and the Equation (14), the increment in the transmission torque of the first brake B1 can be expressed, as in the Equation (16), in the form of the function of the torque applied to the second brake B2 so as to release the second brake B2. In other words, the increment in the transmission torque of the first brake B1 can be obtained based on the torque transmitted to the second brake B2.

$$Tb1\_add = (\gamma_1 \times \alpha_2 - \gamma_2 \times \alpha_1)/(\beta_1 \times \alpha_2 - \beta_2 \alpha \alpha_1) \times (-Tb2\_need) \quad (16)$$

The value that is obtained by adding the torque TT_add obtained in the Equation (15) above to the turbine torque TT_org obtained based on the required driving force can be a target torque TT_target of the turbine torque. In addition, the value that is obtained by adding the transmission torque Tb1_org of the first brake B1 obtained by using the Equation (9) above to the increment Tb1_add in the transmission torque of the first brake B1 obtained by using the Equation (16) can be a target torque Tb1_target of the first brake B1. The Equation (17) and the Equation (18) represent equations for calculating the target torque TT_target of the engine 3 and the target torque Tb1_target of the first brake B1.

$$TT\_target = TT\_org + TT\_add \quad (17)$$

$$Tb1\_target = Tb1\_org + Tb1\_add \quad (18)$$

Figure 1:
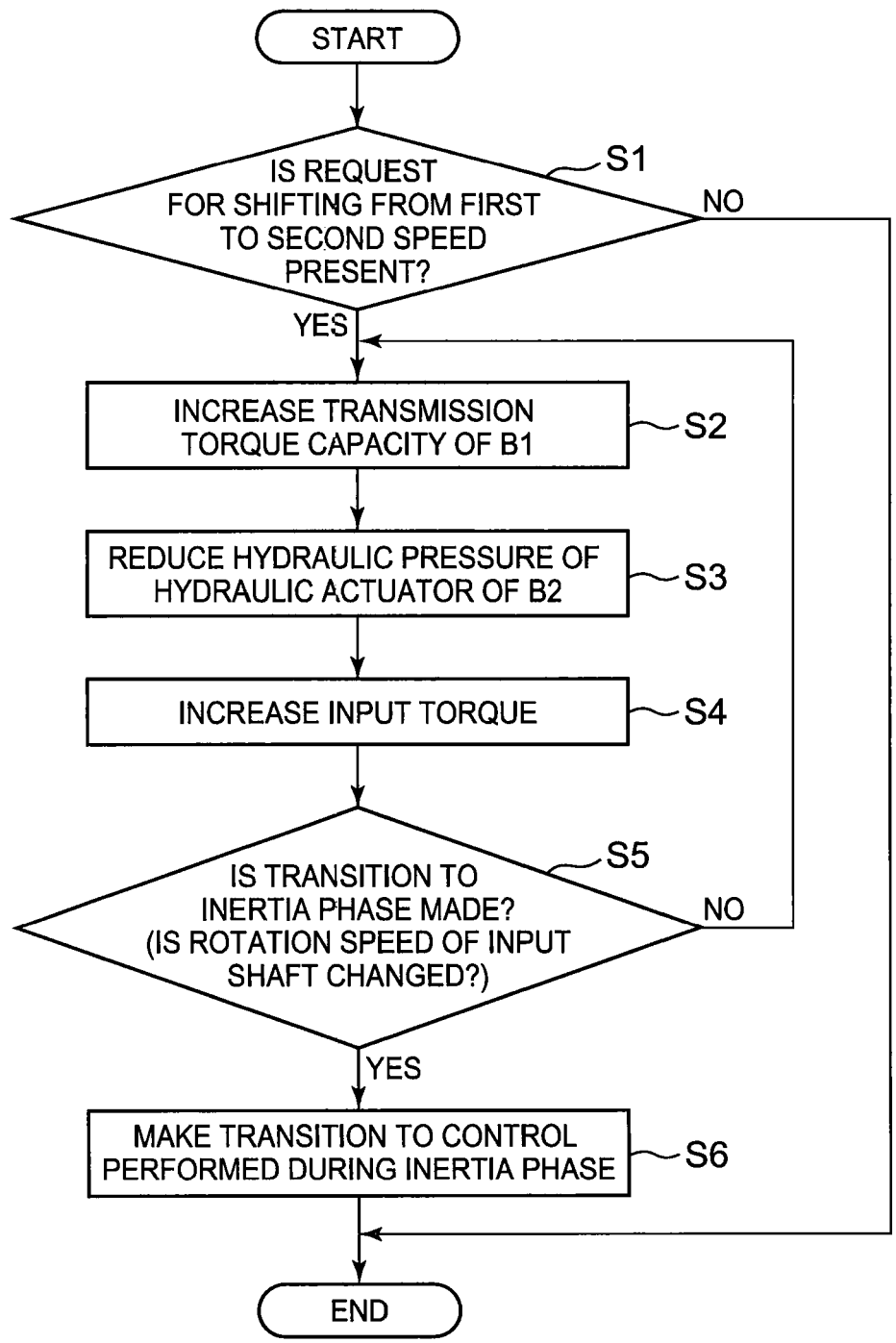
FIG. 1 is a flowchart for showing an example of control by a control device according to the invention.

Next, an example of the control that is performed by the ECU 18 in the transmission control device having the above-described configuration will be described with reference to the flowchart illustrated in FIG. 1. The flowchart illustrated in FIG. 1 is repeatedly executed at predetermined time intervals. According to the example illustrated in FIG. 1, it is determined first whether or not a request for the shifting from the forward first speed to the forward second speed is present (Step S1). Specifically, it is determined whether or not the request for the shifting from the forward first speed to the forward second speed is present in accordance with the vehicle speed and the accelerator opening as described above or it is determined whether or not the request for the shifting is present in accordance with a shift lever position, various switch operations, or the like. When the upshift is requested in a state where an accelerator pedal is depressed, it is preferable to improve the shift response. Accordingly, this control may be initiated in a case where the request for the shifting from the forward first speed to the forward second speed is present with the vehicle speed becoming equal to or greater than a predetermined vehicle speed in a state where the accelerator pedal is depressed. In a case where the request for the shifting from the forward first speed to the forward second speed is absent and a negative determination is made in Step S1, this routine is temporarily terminated as it is.

In a case where the request for the shifting from the forward first speed to the forward second speed is present and a positive determination is made in Step S1, in contrast, the transmission torque capacity of the first brake B1 is increased (Step S2), with the value obtained in the Equation (18) above being the target value, so as to reduce the negative torque that is applied to the second brake B2 or to apply the positive torque to the second brake B2.

In addition, the hydraulic pressure of the hydraulic actuator 24 that controls the second brake B2 is reduced (Step S3). In other words, the thrust that acts on the piston 19 is reduced. Specifically, oil is discharged from a hydraulic pressure chamber of the hydraulic actuator 24. In Step S3, the hydraulic pressure may be controlled and reduced at the same time or, simply, the oil may be drained.

After Step S3, in addition, the output torque of the engine 3 is increased (Step S4), with the value obtained in the Equation (17) above being the target value, so as to suppress a reduction in the torque transmitted to the second ring gear 17 when the second brake B2 is released. As is known, the output torque of the engine 3 can be increased and decreased by changing the degree of throttle opening. The procedure for initiating Step S2 to Step S4 is not particularly limited, and Step S2 to Step S4 may be initiated at the same time.

When the transmission torque capacity of the first brake B1 is increased with the shifting from the forward first speed to the forward second speed initiated as described above, the negative torque that is applied to the second brake B2 is gradually reduced, and then the positive torque is applied to the second brake B2. The second brake B2 is released for a transition to an inertia phase when the positive torque is applied to the second brake B2 as described above. Accordingly, after Step S4, it is determined whether or not the transition to the inertia phase has occurred (Step S5). Specifically, it is determined whether or not the rotation speed of the input shaft 10 has begun to change because the rotation speed of the second sun gear 12 begins to be reduced to become close to "0" and the rotation speed of the input shaft 10 begins to be reduced when the second brake B2 is released. This determination is to promptly initiate inertia phase control by determining that the second brake B2 is released.

In a case where the transition to the inertia phase has yet to be made, for example, in a case where only a short period of time has passed since the initiation of the shift control, and a negative determination is made in Step S5, Step S2 to Step S4 are repeatedly executed until the transition to the inertia phase. In the case of the transition to the inertia phase and a positive determination in Step S5, in contrast, the control of the inertia phase is initiated (Step S6) and this routine is temporarily terminated. In the inertia phase, the rotation speeds of both the second sun gear 12 and the input shaft 10 change and no torque is transmitted to a drive wheel. Accordingly, the output of the engine 3 is reduced because the engine 3 is blown when the output of the engine 3 is high. In addition, in a case where the transmission torque capacity of the first brake B1 is small, the torque does not act to reduce the rotation speed of the engine 3 and the length of time taken until the transmission torque capacity of the first brake B1 is increased to a transmission torque capacity required after the shifting increases. Accordingly, the transmission torque capacity of the first brake B1 is set to be almost as high as the transmission torque capacity required after the shifting. Then, after the engine rotation speed (rotation speed of the input shaft 10) is reduced to a rotation speed based on the transmission ratio of the forward second speed and the vehicle speed, the output of the engine 3 is increased to a value corresponding to the required driving force and the first brake B1 is completely engaged not to slip.

Figure 3A:
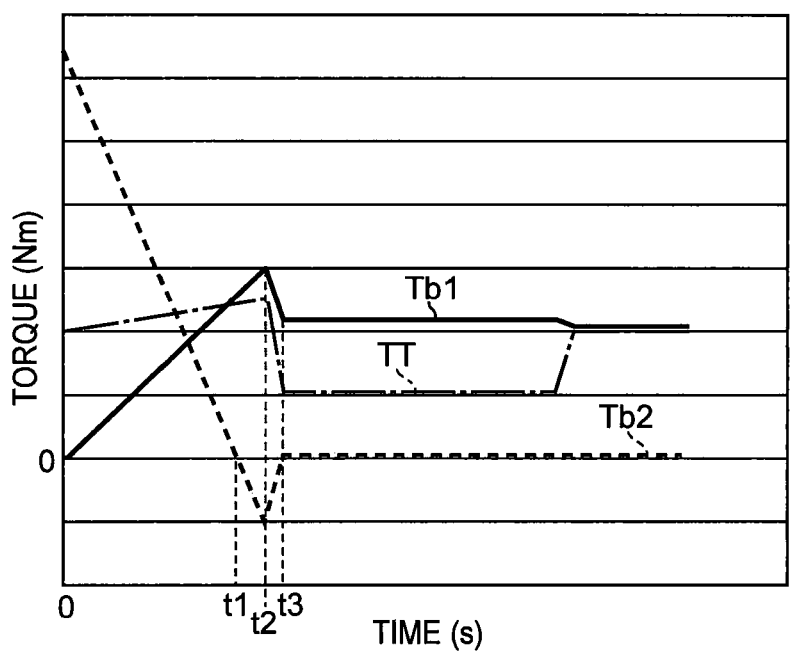
FIG. 3A is a time chart illustrating how the transmission torque of each brake and the torque of an input shaft change during the execution of the control illustrated in FIG. 1.
Figure 3B:
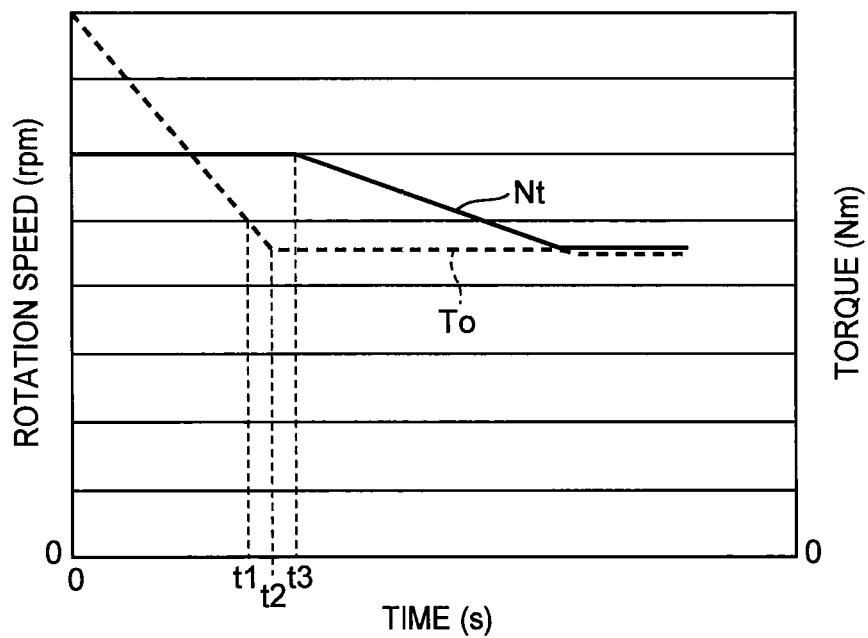
FIG. 3B is a time chart illustrating how the rotation speed of the input shaft and the torque that is output from a transmission change during the execution of the control illustrated in FIG. 1.

FIG. 3A is a time chart illustrating how the transmission torque of each of the brakes B1, B2 and the torque of the input shaft 10 change during the execution of the control illustrated in FIG. 1. FIG. 3B is a time chart illustrating how the rotation speed of the input shaft 10 and the torque (torque of the second ring gear 17) that is output from the transmission change during the execution of the control illustrated in FIG. 1. In FIG. 3A, the solid line represents the transmission torque (Tb1) of the first brake B1, the dashed line represents the transmission torque (Tb2) of the second brake B2, and the one-dot chain line represents the torque (TT) of the input shaft 10. In FIG. 3B, the solid line represents the rotation speed (Nt) of the input shaft 10 and the dashed line represents the torque (To) of the second ring gear 17. In FIG. 3A, in addition, the direction in which each of the brakes B1, B2 functions as the reaction force while increasing the driving force is illustrated as having a positive value. In other words, at the forward first speed, the second brake B2 functions as the reaction force as described above, and thus has a value exceeding "0".

As illustrated in FIG. 3A, the torque of the input shaft 10 (output torque of the engine 3) begins to increase toward the target value of the output torque of the engine 3 calculated by using the Equation (17) above when the shifting from the forward first speed to the forward second speed is initiated. Specifically, the output torque of the engine 3 increases to reach the target value calculated by using the Equation (17) at the point in time when the length of time required until the release of the piston 19 after the establishment of a shift determination has elapsed. For structural reasons, the engine 3 cannot change the torque in steps. Accordingly, the output torque begins to increase before the torque for releasing the second brake B2 begins to be applied to the second brake B2.

The transmission torque of the first brake B1 begins to increase substantially at the same time as the output torque of the engine 3 begins to increase. The target value of the transmission torque of the first brake B1 pertaining to this case is the value calculated by using the Equation (18) above, and the transmission torque of the first brake B1 begins to increase to reach the target value at the point in time when the length of time required until the release of the piston 19 after the establishment of the shift determination has elapsed. This is to suppress the blowing of the engine 3 by the increase in the torque of the engine 3. According to FIG. 3A, the output torque of the engine 3 and the transmission torque of the first brake B1 proportionally change. However, the manner of the change is not particularly limited.

Even when the transmission torque of the first brake B1 is increased as described above, the first brake B1 is in the slip state because the second brake B2 has yet to be engaged. In addition, a transition to a torque phase is made when the first brake B1 transmits the torque as described above, and thus the torque that is transmitted to the second ring gear 17 is reduced as a result of the increase in the transmission torque of the first brake B1.

When the transmission torque of the first brake B1 reaches a predetermined magnitude (time t1), the transmission torque of the second brake B2 becomes "0". When the transmission torque of the first brake B1 is further increased to reach the target torque and the output torque of the engine 3 is increased to reach the target torque (time t2), the piston 19 is released after the meshing of the second brake B2 is changed as described above. In this case, the engine 3 has an increased output torque, and thus a reduction in the output torque of the second ring gear 17 attributable to the release of the second brake B2 does not occur.

When the second brake B2 is released as described above, the first brake B1 slips and the transmission torque capacity of the first brake B1 is set for the torque for releasing the second brake B2 to be applied. Accordingly, the rotation speed of the input shaft 10 begins to be reduced (time t3) promptly after the release of the second brake B2. In other words, the transition to the inertia phase is made. Accordingly, the control of the inertia phase is initiated and the transmission torque capacity of the first brake B1 is changed in accordance with the torque of the input shaft 10 while the torque of the input shaft 10 is reduced so as to suppress the blowing of the engine 3. Also, the torque of the input shaft 10 can be changed by changing the degree of throttle opening in the engine 3. According to FIG. 3A, the transmission torque of the first brake B1 is not reduced until the time t2. Point is, however, suppressing the blowing of the engine 3 may be performed by keeping a balance between the torque of the input shaft 10 and the transmission torque of the first brake B1, and thus the transmission torque of the first brake B1 can be maintained at the same value as at the time t2 when the torque of the input shaft 10 is increased to exceed that in FIG. 3A.

When the rotation speed of the input shaft 10 is reduced to the rotation speed that is calculated based on the vehicle speed and the gear ratio at the forward second speed, the torque of the input shaft 10 is controlled to a torque corresponding to the required driving force and the first brake B1 is completely engaged. According to FIG. 3A, which illustrates the transmission torque of the first brake B1, the transmission torque of the first brake B1 does not change even when the transmission torque capacity of the first brake B1 is increased to the maximum value after the shifting to the forward second speed.

When the transmission torque capacity of the first brake B1 that sets the transmission stage after the shifting is increased by forming the inclined surface in the piston 19 in the second brake B2 as described above, the torque is applied to the second brake B2 so that the piston 19 is released and the second brake B2 can be released. In addition, the transition to the inertia phase can be made promptly after the release of the second brake B2. Accordingly, time is not required for determining that the torque applied to the second brake B2 is reduced and determining that the second brake B2 is released, and thus the shift response can be improved. In addition, the second brake B2 can be released by controlling the transmission torque capacity of the first brake B1, and thus an increase in the complexity of the control, such as the cooperation between the control for releasing the second brake B2 and the control for changing the transmission torque capacity of the first brake B1, can be suppressed. Moreover, the speed at which the piston 19 is moved can be improved since the second brake B2 is released by the second carrier 16 pressing the piston 19. As a result, the length of time taken until the completion of the release of the second brake B2 after the second brake B2 begins to be released can be shortened. Accordingly, the shift response can be further improved. In addition, an increase in the size of the transmission control device can be suppressed since no other device for releasing the second brake B2 has to be disposed.

A reduction in the torque that is transmitted to the second ring gear 17 can be suppressed by increasing the output torque of the engine 3 during the release of the second brake B2. As a result, a shift shock attributable to a temporary reduction in the transmission torque of the second ring gear 17 can be suppressed. In this case, the output torque of the engine 3 and the transmission torque of the first brake B1 are calculated based on the length of time of the release of the second brake B2, that is, based on the torque that is applied to the second brake B2. Accordingly, the occurrence of the shift shock can be suppressed even when the length of time required for the release of the second brake B2 is appropriately set.

The first engagement mechanism according to the invention is not limited to being engaged during the setting of the transmission stage (forward first speed) having the maximum transmission ratio. Instead, for example, the first engagement mechanism according to the invention may be an engagement mechanism that is engaged during the setting of the forward second speed. In other words, the first brake B1 in FIG. 4 may be a mesh-type brake in which inclined surfaces are formed in the dog teeth as illustrated in FIG. 7. In this case, the shifting can be performed by increasing the transmission torque capacity of the third clutch C3 to release the first brake B1 during the shifting from the forward second speed to the forward third speed.

In addition, the first engagement mechanism according to the invention is not limited to functioning to stop the rotating member. Instead, the first engagement mechanism according to the invention may be configured to function as a so-called clutch for connection between members rotating relatively to each other. Specifically, a mesh-type clutch in which the inclined surfaces are formed in the dog teeth as illustrated in FIG. 7 may take the place of the first clutch in FIG. 4. In a case where the mesh-type clutch takes the place of the first clutch C1 as described above, the torque can be applied to release the first clutch C1 by increasing the transmission torque capacity of the fourth clutch C4 during a transition from the forward fifth speed to the forward sixth speed.

In the example that has been described above, the upshift from the forward first speed to the forward second speed has been described as an example. However, the invention can also be applied to the case of shifting to a transmission stage higher than the forward second speed such as upshift from the forward first speed to the forward third speed and upshift from the forward first speed to the forward fourth speed. In a case where the so-called jump shift is performed as described above, the transmission torque capacity of the third clutch C3 may be increased during the upshift to the forward third speed and the transmission torque capacity of the fourth clutch C4 may be increased during the upshift to the forward fourth speed.

In FIG. 7, a configuration in which the dog teeth are formed on the surfaces of the second carrier 16 and the piston 19 that face each other is illustrated as an example. However, as in known dog clutches, the fixed portion 5 and the rotating member may be configured to be engaged with each other by forming dog teeth on the outer circumferential surface of the rotating member and moving a sleeve which meshes with the dog teeth in the axial direction.

Moreover, the transmission according to the invention is not limited to setting the transmission stage by engaging the rotating elements of the planetary gear mechanisms with each other as illustrated in FIG. 4 or fixing any one of the rotating elements. Instead, the transmission may be a transmission having a configuration in which a plurality of gears are connected to an input shaft to be capable of relative rotation, any one of the gears and the input shaft are engaged with each other by a dog clutch for the setting a predetermined transmission stage, and the other gear and the input shaft are engaged with each other by a friction clutch for shifting to a desired transmission stage which has a lower transmission ratio than the predetermined transmission stage as described in JP 2002-174335 A.

What is claimed is:

1. A control device for a vehicle, the vehicle including a transmission and an engine configured to input a torque into the transmission, the transmission having multiple transmission stages and including a first engagement mechanism and a second engagement mechanism, the first engagement mechanism including a first member and a second member, the first member being provided with first dog teeth, the first dog teeth including first tooth surfaces directed to one side in a circumferential direction and second tooth surfaces directed to the other side in the circumferential direction, the second member being provided with second dog teeth, the second dog teeth including third tooth surfaces facing the first tooth surfaces and fourth tooth surfaces facing the second tooth surfaces, the second member being configured to be moved in an axial direction such that the second dog teeth mesh with the first dog teeth, the first engagement mechanism being configured to transmit a torque between the first member and the second member when the second dog teeth mesh with the first dog teeth, the second engagement mechanism including a third member and a fourth member, the second engagement mechanism being configured to perform switching between a state where the third member and the fourth member rotate relative to each other and a state where the third member and the fourth member are connected to each other for torque transmission, the second engagement mechanism being configured to change a capacity of the torque transmission between the third member and the fourth member during the connection, the transmission being configured to select a first transmission stage among the transmission stages by engaging the first engagement mechanism and releasing the second engagement mechanism, the transmission being configured to select a second transmission stage having a transmission ratio lower than the transmission ratio of the first transmission stage by releasing the first engagement mechanism and engaging the second engagement mechanism, the transmission being configured to reverse the direction of a torque acting on the first member or the second member as a result of an increase in the capacity of the torque transmission of the second engagement mechanism when the second engagement mechanism is engaged, and the first tooth surfaces and the third tooth surfaces being inclined surfaces such that a thrust for separating the first member and the second member from each other in the axial direction is generated in accordance with a torque in a direction in which the first tooth surfaces and the third tooth surfaces are brought into contact with each other when the second transmission stage is set, the control device comprising:

an electronic control unit configured to:
(a) control the second engagement mechanism when the second transmission stage is set such that the capacity of the torque transmission of the second engagement mechanism is increased and the thrust for separating the first member and the second member from each other in the axial direction is generated;
(b) calculate a decrement in an output torque of the transmission when the capacity of the torque transmission of the second engagement mechanism is increased; and
(c) increase a torque input into the transmission by the engine based on the decrement in the output torque by controlling the engine.

2. The control device according to claim 1, wherein the electronic control unit is configured to control the capacity of the torque transmission of the second engagement mechanism based on the torque input into the transmission when the second transmission stage is set.

3. The control device according to claim 1, wherein the electronic control unit is configured to calculate a length of time required for separating the second member from the first member when the second transmission stage is set, and
the electronic control unit is configured to obtain the decrement in the output torque of the transmission based on the calculated length of time.

4. The control device according to claim 1, wherein the first engagement mechanism includes a brake mechanism.

5. The control device according claim 1, wherein the first member and the second member are configured to rotate relative to each other, and
the first engagement mechanism is configured to connect the first member and the second member to each other for integral rotation with the first dog teeth and the second dog teeth meshing with each other.

6. The control device according to claim 1, wherein the first engagement mechanism includes a thrust generation mechanism configured to control a load for pressing the second member to the first member side, and
the thrust generation mechanism is configured to reduce the load by which the second member is pressed to the first member side when the second transmission stage is set.

7. The control device according to claim 1, wherein the transmission includes a third engagement mechanism engaged when the first transmission stage is set and when the second transmission stage is set.

8. The control device according to claim 1, wherein the transmission includes a first planetary gear mechanism and a second planetary gear mechanism,
each of the first planetary gear mechanism and the second planetary gear mechanism includes at least three rotating elements, and
the first engagement mechanism and the second engagement mechanism are configured to connect the rotating elements of any one of the first planetary gear mechanism and the second planetary gear mechanism to each other or fix the rotating elements of any one of the first planetary gear mechanism and the second planetary gear mechanism.

* * * * *